United States Patent
Tamada

(10) Patent No.: US 6,931,359 B2
(45) Date of Patent: Aug. 16, 2005

(54) HUMAN INTERFACE METHOD AND APPARATUS

(76) Inventor: Ken Tamada, Room 18-D, Bld. -4, SANHE Garden, No. 123 YanPing Road, Shanghai (CN), 200042

(*) Notice: Subject to any disclaimer, the term of this patent is extended or adjusted under 35 U.S.C. 154(b) by 0 days.

(21) Appl. No.: 10/275,992

(22) PCT Filed: Aug. 5, 2001

(86) PCT No.: PCT/IB01/01065

§ 371 (c)(1), (2), (4) Date: Mar. 5, 2003

(87) PCT Pub. No.: WO01/86403

PCT Pub. Date: Nov. 15, 2001

(65) Prior Publication Data

US 2003/0158692 A1 Aug. 21, 2003

Related U.S. Application Data

(63) Continuation-in-part of application No. 09/567,176, filed on May 8, 2000, now abandoned.

(51) Int. Cl.$^7$ ............................................. H03M 11/10
(52) U.S. Cl. ..................... 702/189; 702/108; 702/124; 702/182
(58) Field of Search ............................. 702/19, 22, 23, 702/30–32, 98, 108, 124, 122, 139, 160, 127, 182, 183, 187, 188, FOR 103–104, FOR 115–119, FOR 134–135, FOR 141, FOR 143, FOR 155, FOR 170; 434/247, 258; 463/23, 26; 600/301, 481, 503, 519, 544, 545, 546, 522; 482/1, 3, 4, 8, 9, 901, 902

(56) References Cited

U.S. PATENT DOCUMENTS

| | | | | |
|---|---|---|---|---|
| 3,972,320 A | * | 8/1976 | Kalman | 600/519 |
| 4,512,567 A | * | 4/1985 | Phillips | 463/37 |
| 5,001,632 A | * | 3/1991 | Hall-Tipping | 463/7 |
| 5,076,584 A | * | 12/1991 | Openiano | 463/36 |
| 5,230,673 A | * | 7/1993 | Maeyama et al. | 482/5 |
| 5,318,487 A | * | 6/1994 | Golen et al. | 482/5 |
| 5,335,188 A | * | 8/1994 | Brisson | 702/163 |
| RE34,728 E | * | 9/1994 | Hall-Tipping | 364/413.04 |
| 5,404,128 A | * | 4/1995 | Ogino et al. | 340/425.5 |
| 5,492,514 A | * | 2/1996 | Daum | 482/8 |
| 5,591,104 A | * | 1/1997 | Andrus et al. | 482/7 |
| 5,704,875 A | * | 1/1998 | Tanabe | 482/4 |
| 5,741,217 A | | 4/1998 | Gero | |
| 5,974,262 A | | 10/1999 | Fuller et al. | |
| 5,990,866 A | | 11/1999 | Yollin | |
| 6,033,344 A | * | 3/2000 | Trulaske et al. | 482/7 |
| 6,066,075 A | * | 5/2000 | Poulton | 482/8 |
| 6,152,856 A | * | 11/2000 | Studor et al. | 482/8 |
| 6,587,043 B1 | * | 7/2003 | Kramer | 340/435 |
| 2001/0001238 A1 | * | 5/2001 | Pin | 341/27 |
| 2003/0186784 A1 | * | 10/2003 | Ogawa | 482/8 |

* cited by examiner

Primary Examiner—Carol S. W. Tsai
(74) Attorney, Agent, or Firm—Hovey Williams LLP

(57) ABSTRACT

A method and apparatus for measuring one or more physical conditions of a computer operator and for automatically inputting signals corresponding to the physical conditions into a computer (12) for control and monitoring purposes.

17 Claims, 2 Drawing Sheets

HUMAN INTERFACE METHOD AND APPARATUS

CROSS REFERENCE TO RELATED APPLICATION

This application is a Continuation in Part of U.S. Pat. No. 09/567,176 titled "Human Interface Method and Apparatus" whose inventor is Ken Tamada, which was filed on May 8, 2000, now abandoned.

BACKGROUND OF THE INVENTION

1. Field of the Invention

The present invention relates to computer interface devices and methods. More particularly, the invention relates to a method and apparatus for measuring one or more physical conditions of a person and inputting signals corresponding to the physical conditions into a computer for control and monitoring purposes and for permitting computer users to interact with other remote computer users via a communications network.

2. Description of the Prior Art

Many computer programs are designed for use by computer operators having different levels of experience or knowledge. For example, many computer games have different "levels" or speeds that accommodate players of different skill levels. Similarly, many computer application programs have various features ranging from simple to complex that may be used by different persons depending upon their skill levels.

Computer operators can currently only interact with a computer by inputting data or information into the computer via a keyboard, computer mouse, or other manually operated input device. These types of computer input devices cannot determine information about a computer user and then automatically input the information but instead rely upon the operator to manually enter all information. Thus, computer operators wishing to interact with a computer program based on their skill or knowledge level must currently manually input such information into the computer. For example, a computer user having a high skill level for a particular computer game currently must manually enter information relating to their skill level to cause the computer program to operate at a higher level or speed.

Another problem with conventional computer input devices is that they cannot automatically enter sensory information into a computer relating to a physical condition of an operator. This is a problem because many computer users work in stressful conditions in which their current physical condition may be an important factor. Also, current computer input devices do not permit computer users to interact with other remote computer users without manually entering information.

OBJECTS AND SUMMARY OF THE INVENTION

The present invention solves the above-described problems and provides a distinct advance in the art of computer input devices. More particularly, the present invention provides a method and apparatus for measuring one or more physical conditions of a person with a sensor and automatically inputting sensor signals corresponding to the physical conditions into a computer for control and monitoring purposes and for permitting computer users to interact with other remote computer users via a communications network.

One embodiment of the method of the present invention includes the steps of measuring with a sensor worn or touched by the user a physical condition of the user when the user is in a rest state and generating corresponding rest state sensor signals; inputting the rest state sensor signals into the computer; running a computer program on the computer that requires interaction by the user; measuring with the sensor the physical condition of the user when the user is interacting with the computer program and generating corresponding active state sensor signals; inputting the active state sensor signals into the computer; comparing the rest state sensor signals to the active state sensor signals; and changing some aspect of the computer program when the active state signals differ from the rest state signals by a predetermined amount.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
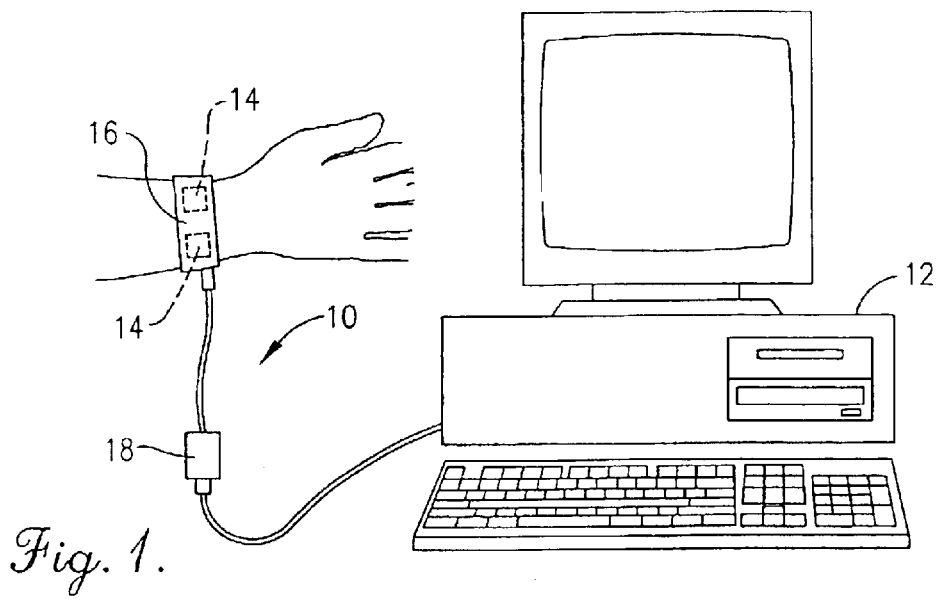
FIG. 1 is a schematic diagram showing a human interface device constructed in accordance with a preferred embodiment of the present invention shown coupled with a personal computer.

Turning now to the drawing figures, and particularly FIG. 1, the present invention broadly includes a human interface device 10 and a computer program that may be run on a computer 12 such as the one illustrated. The human interface device 10 measures one or more physical conditions of a computer operator and automatically inputs signals corresponding to the physical conditions into the computer 12. The computer program then analyzes the signals to control certain aspects of other computer programs run by the computer 12 or for monitoring purposes as described in more detail below. The signals may also be used to permit computer users to interact with other remote computer users via a communications network.

The human interface device 10 includes one or more sensors 14, a carrier 16 that permits the sensors to be worn by an operator of the computer 12, and a computer interface 18 for coupling the sensors with the computer 12. The sensors 14 may be any commercially available sensors that measure physical conditions such as blood pressure, pulse rate, body temperature, static capacity, skin conductivity, brain wave activity, $NO_2$ or $NO_3$ blood density, static electricity, or blood characteristics. The sensors 14 each preferably include a signal amplifier and an analog-to-digital converter for producing digital sensor signals corresponding to the measured physical conditions.

The sensors 14 are mounted to or on the carrier 16 so that the sensors 14 can be worn by an operator of the computer 12. One embodiment of the carrier 16 is a wristband that places the sensors 14 against a person's wrist or forearm as illustrated in FIG. 1. This permits the sensors 14 to easily monitor a person's blood pressure, pulse, body temperature, or skin conductivity. The carrier 16 may also be a headphone type carrier 16 for placing the sensors against a person's ear and head.

The sensors 14 may also be attached to or mounted on a device that is held by an operator so that the sensors 14 do not have to be worn by the operator. For example, the sensors 14 may be incorporated into a computer mouse so that the sensors 14 monitor an operator's physical condition while the operator is manipulating the mouse. For this embodiment, the mouse would preferably include an orifice or a hole in which an operator could place one of his or her fingers. The sensor or sensors 14 would be mounted in the hole to measure the physical conditions described above while the operator used the mouse.

The sensors 14 may also be incorporated into a computer joystick so that the sensors 14 could monitor a physical condition of an operator while playing a computer game or before starting the game. As with the mouse, the joystick would include an orifice or a hole for receiving an operator's finger. The sensors may also be incorporated into other devices such as a table pad, a mouse pad, a desk, a chair, a floor mat, a hand print device, a foot print device, or even an automatic shoulder massager.

The computer interface 18 receives sensor signals from the sensors 14 and delivers the signals to the computer 12. In preferred forms, the computer interface 18 is a universal serial bus (USB) or mini-USB interface that couples with a conventional USB port on the computer 12. The computer interface 18 may also be a PS2 mouse type interface, an SCSI interface, an RS-232C interface, a parallel interface, a serial interface, or even a wireless interface.

The computer program is operable for receiving the sensor signals from the human interface device 10 and for controlling certain operations of the computer 12 in response thereto. The program is stored on computer readable memory accessible by the computer 12 such as the computer's hard drive and may be written in any computer language as a matter of design choice.

Figure 3:
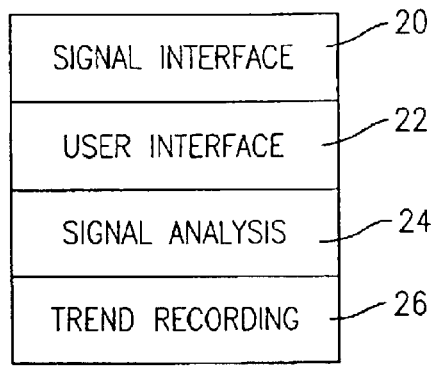
FIG. 3 is a block diagram illustrating several core components of a computer program that may be used with the human interface of the present invention.

As illustrated in FIG. 3, the computer program broadly includes a signal interface component 20, a user interface component 22, a signal analysis component 24, and a trend recording component 26. The signal interface component 20 receives the sensor signals from the human interface device 10 and performs any necessary error checking functions. The user interface component 22 provides a graphical user interface on the monitor of the computer 12 to allow an operator to control certain functions of the computer program as described in more detail below. The signal analysis component 24 analyzes the sensor signals received from the human interface device 10 and controls certain operations of the computer 12 or other computers as described in more detail below. The trend recording component 26 records the sensor signals along with other information in a database that may be accessed for monitoring and control purposes.

Figure 4:
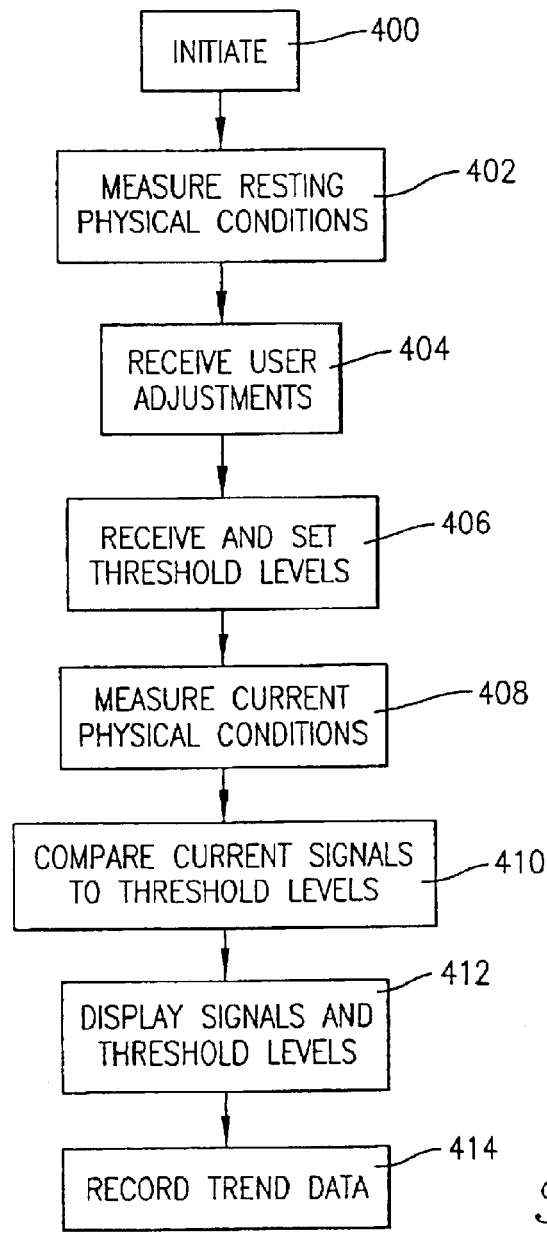
FIG. 4 is a flow diagram depicting certain steps of the computer program.

The flow diagram illustrated in FIG. 4 depicts several steps performed by the computer program for one application of the present invention. The computer program is initiated in step 400 when an operator of the computer 12 connects the computer interface 18 to the computer 12. The operator then puts on the wristband carrier 16 or other carrier so that the sensors 14 may begin to measure certain physical conditions of the operator and transmit corresponding sensor signals to the computer 12.

The computer program preferably first monitors the physical conditions of the operator before the operator has begun using the computer 12 to obtain resting sensor signals as depicted in step 402. The operator may then view the resting sensor signals on the monitor of the computer 12 and adjust the sensor signals to accommodate for irregularities as depicted in step 404. For example, if the operator is currently experiencing a high pulse rate due to recent exercise, the operator may manually change the resting sensor signals accordingly.

The computer program next sets threshold levels corresponding to the resting sensor signals as depicted in step 406. The threshold levels are typically some percentage of the resting sensor signals. For example, the threshold levels may be + or −30% of the measured resting sensor signals from each of the sensors 14 for a low alarm and + or −50% of the measured resting sensor signals from each of the sensors for a high alarm.

Once the computer program has received and stored the resting sensor signals and set the threshold levels, the operator may begin to use the computer 12. For example, the operator may begin playing a computer game or using an application program stored on the computer 12. While the operator uses the computer 12, the human interface device 10 continues to measure the physical conditions of the operator and to send corresponding sensor signals to the computer 12 as depicted in step 408. The computer program compares the current sensor signals to the threshold levels as depicted in step 410 and displays both the current signals and the threshold levels on the computer 12 monitor as depicted in step 412.

In accordance with one important aspect of the present invention, the computer program may control certain aspects of the computer 12 based on the received sensor signals and the comparison steps. For example, the computer program may determine that an operator who is playing a computer game is not challenged based on the measurement of the operator's physical conditions. The computer program may then increase the speed or difficulty of the computer game so that the game is more exciting to the operator.

Similarly, the computer program may determine that an operator who is using a certain application program is experiencing high levels of stress and/or fatigue. The computer program may then reduce the workload of the operator and/or alert the operator or a supervisor that the operator needs a break or assistance.

The computer program also preferably stores and records the sensor signals along with other information in a database for later analysis as depicted in step 414. For example, the computer program may store the sensor signals and the date and time each instance when an operator's current sensor signals exceed the threshold levels. A supervisor or other person may then analyze the information in the database for monitoring purposes.

Figure 2:
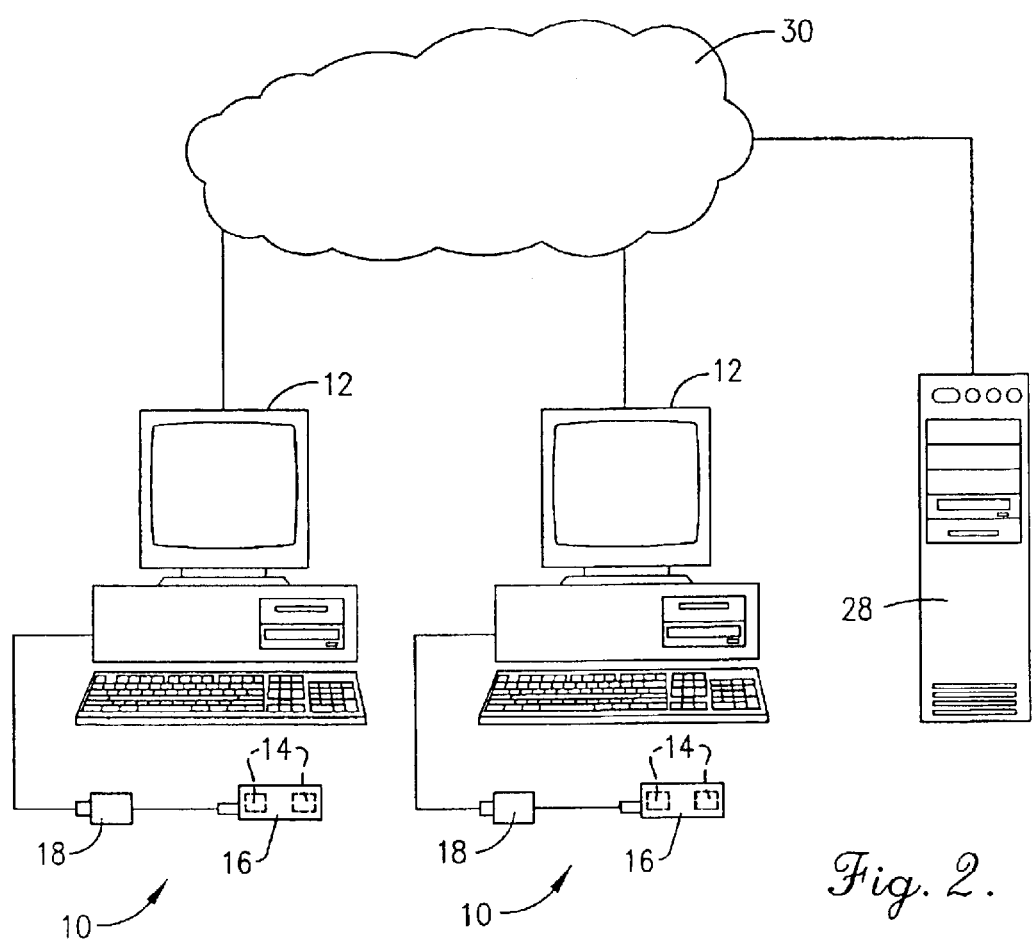
FIG. 2 is a schematic diagram of several human interfaces and personal computers shown coupled with a host computer via a communications network.

In another embodiment of the present invention, several computers 12 and human interface devices 10 may be connected to or through a host computer 28 via a communications network 30 as depicted in FIG. 2. The human interface devices 10 may also be connected to the host computer via mobile phones with Internet capabilities or even televisions with Internet capabilities. The communications network 30 may be any conventional network such as the Internet, a local area network, a wide area network, or even a wireless network. The communications network may also link several personal computers 12 directly without use of the host computer 28.

The host computer 28 is used to remotely monitor physical conditions of operators of the computers 12 or to provide information to the computers 12. For example, in one application, the host computer 28 may be operated by a supervisor to monitor the physical conditions of the operators of the computers 12 to ensure that the operators are not too fatigued or stressed. The host computer may also be used to monitor the physical conditions of pilots, drivers, or others that are being monitored by the operators of the computers 12.

In another application, the host computer 28 may be used to conduct remote interviews. An interviewee wears the sensors 14 or places their hands on the mouse or joystick and uses one of the computers 12 to video conference with an interviewer operating the host computer 28. The computer program running on the personal computers 12 provides sensor signals to the host computer 28 corresponding to the monitored physical conditions of the interviewees. This application provides valuable information to interviewers that cannot be obtained by conventional methods.

In another application, the host computer 28 may be used to remotely monitor a person's physical conditions for health reasons. For example, people who are recovering from illnesses or accidents at home may be monitored by a doctor or hospital operating the host computer 28.

In another application, the host computer 28 may be used for online remote marketing research type services. For example, selected consumers may be instructed to wear the sensors 14 and then watch certain commercials presented to them on the computers. The operator of the host computer 28 may then collect and analyze sensor signals corresponding to the physical conditions of the consumers to determine how they respond to certain types of commercials.

In another application, the host computer 28 may be used for remote education or training purposes. For example, students may be instructed to wear or touch the sensors 14 while taking a class via one of the computers 12. A teacher may then monitor the physical conditions of the students to determine if a lecture is of the appropriate difficulty or speed.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of generating and using information regarding a physical condition of an operator of a computer running a computer program, the method comprising the steps of:
   (a) measuring with a sensor the physical condition of the operator when the operator is in a rest state, and generating a corresponding rest state sensor signal;
   (b) measuring with the sensor the operator's physical condition that is a direct response to the operator's interaction with the computer program, and generating a corresponding active state sensor signal;
   (c) comparing the rest state sensor signal to the active state sensor signal; and
   (d) changing an aspect of the computer program when the active state signal differs from the rest state signal by a predetermined amount.

2. The method as set forth in claim 1, wherein the physical condition is selected from the group consisting of: blood pressure, pulse rate, body temperature, static capacity, skin conductivity, brain wave activity, $NO_2$ blood density, $NO_3$ blood density, static electricity, and blood characteristics.

3. The method as set forth in claim 1, wherein the sensor is incorporated into a device selected from the group consisting of: wristband, headphone, mouse, joystick, desk, chair, and floor mat.

4. The method as set forth in claim 1, wherein the computer program is a computer game, and the aspect of the computer game relates to a level of difficulty of play, such that, in step (d), the level of difficulty of play is changed when the active state signal differs from the rest state signal by the predetermined amount.

5. The method as set forth in claim 1, wherein the computer program is a computer game, and the aspect of the computer game relates to a speed of play, such that, in step (d), the speed of play is changed when the active state signal differs from, the rest state signal by the predetermined amount.

6. The method as set forth in claim 1, further including the step of (e) communicating a warning or a suggestion to the operator based on the physical condition of the operator as evidenced by an amount of difference between the rest state sensor signal and the active state sensor signal.

7. The method as set forth in claim 1, further including the step of (e) communicating a warning or a suggestion to a supervisor of the operator based on the physical condition of the operator as evidenced by an amount of difference between the rest state sensor signal and the active state sensor signal.

8. The method as set forth in claim 1, further including the step of (e) storing the rest state sensor signal and the active state sensor signal and a date and a time for use in analyzing working conditions based on a change in the physical condition of the operator during operation of the computer program as evidenced by an amount of difference between the rest state sensor signal and the active state sensor signal.

9. The method as set forth in claim 1, further including the step of (e) storing the rest state sensor signal and the active state sensor signal and a date and a time for use in analyzing working conditions based on a change in the physical condition of the operator during a specific period of time as evidenced by an amount of difference between the rest state sensor signal and the active state sensor signal.

10. The method as set forth in claim 1, further including the initial step of connecting the sensor with a remote host computer using a communication link provided by a wireless telephone, wherein steps (c) and (d) are performed by the remote host computer.

11. The method as set forth in claim 1, further including the initial step of connecting the sensor with a remote host computer using a communication link provided by a television adapted to access a network, wherein steps (c) and (d) are performed by the remote host computer.

12. A method of generating and using information regarding a physical condition of an operator of a computer presenting an advertisement, the method comprising the steps of:
   (a) measuring with a sensor the physical condition of the operator when the operator is in a rest state, and generating a corresponding rest state sensor signal;
   (b) measuring with the sensor the physical condition of the operator when the operator is exposed to the advertisement presented on the computer, and generating a corresponding active state sensor signal;
   (c) comparing the rest state sensor signal to the active state sensor signal; and
   (d) analyzing the advertisement as a function of an effect of the advertisement on the operator as evidenced by a difference between the rest state sensor signal and the active state sensor signal.

13. A method of generating and using information regarding a physical condition of an operator of a computer, wherein the operator is engaged in an interview via the computer, the method comprising the steps of:
  (a) measuring with a sensor the physical condition of the operator when the operator is in a rest state, and generating a corresponding rest state sensor signal;
  (b) measuring with the sensor the physical condition of the operator when the operator is engaged in the interview via the computer, and generating a corresponding active state sensor signal;
  (c) comparing the rest state sensor signal to the active state sensor signal; and
  (d) analyzing an effect of the interview on the operator as evidenced by a difference between the rest state sensor signal and the active state sensor signal.

14. A method of generating and using information regarding a physical condition of a subject engaged in an activity, the method comprising the steps of:
  (a) linking a sensor to a host computer;
  (b) measuring with the sensor the physical condition of the subject when the subject is in a rest state, and generating a corresponding rest state sensor signal, and transmitting the rest state sensor signal to the host computer;
  (c) measuring with the sensor the physical condition of the subject when the subject is engaged in an activity, and generating a corresponding active state sensor signal, and transmitting the active state sensor signal to the host computer;
  (d) comparing, at the host computer, the rest state sensor signal to the active state sensor signal; and
  (e) communicating an effect of the activity on the subject as a function of a difference between the rest state sensor signal and the active state sensor signal.

15. The method as set forth in claim 14, wherein the subject is a student and the activity involves an educational activity.

16. A method of permitting a first person and a second person to interact, the method comprising the steps of:
  (a) measuring with a sensor worn by the first person, wherein the first person is operating a first device, a physical condition of the first person and generating a sensor signal;
  (b) transmitting the sensor signal to the second person, wherein the second person is operating a second device, via a communications network; and
  (c) displaying the sensor signal on the second device so that the second person can interact with the first person based upon the sensor signal.

17. A method of generating and using information regarding a physical condition of an operator of a vehicle, the method comprising the steps of:
  (a) measuring with a sensor the physical condition of the operator before operating the vehicle, and generating a corresponding rest state sensor signal;
  (b) measuring with the sensor the physical condition of the operator while the operator is operating the vehicle, and generating a corresponding active state sensor signal;
  (c) comparing the active state sensor signal to the rest state sensor signal so as to monitor the operator's physical condition while operating the vehicle; and
  (d) if the active state sensor signal is outside a predetermined acceptable range for the operator while operating the vehicle, alerting a third party that is not the operator engaged in the activity.

* * * * *